United States Patent
Liu et al.

(10) Patent No.: US 12,298,626 B2
(45) Date of Patent: May 13, 2025

(54) LIQUID CRYSTAL ALIGNMENT METHOD COMPRISING APPLYING AN ALIGNMENT VOLTAGE TO A FIRST COMMON ELECTRODE, LIQUID CRYSTAL DISPLAY PANEL, AND MOBILE TERMINAL

(71) Applicant: Shenzhen China Star Optoelectronics Semiconductor Display Technology Co., Ltd., Guangdong (CN)

(72) Inventors: Jinming Liu, Guangdong (CN); Yoonsung Um, Guangdong (CN); Juncheng Xiao, Guangdong (CN); Ji Li, Guangdong (CN); Yun Yu, Guangdong (CN); Xiaojin He, Guangdong (CN); Qi Zhang, Guangdong (CN); Chunxiao Hu, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 17/600,471

(22) PCT Filed: Aug. 26, 2021

(86) PCT No.: PCT/CN2021/114677
§ 371 (c)(1),
(2) Date: Sep. 30, 2021

(87) PCT Pub. No.: WO2023/019623
PCT Pub. Date: Feb. 23, 2023

(65) Prior Publication Data
US 2024/0027837 A1  Jan. 25, 2024

(30) Foreign Application Priority Data
Aug. 19, 2021 (CN) .......................... 202110953924.3

(51) Int. Cl.
*G02F 1/1337* (2006.01)
*G02F 1/1343* (2006.01)

(52) U.S. Cl.
CPC .. *G02F 1/133753* (2013.01); *G02F 1/134345* (2021.01)

(58) Field of Classification Search
None
See application file for complete search history.

(56) References Cited

U.S. PATENT DOCUMENTS

| | | | |
|---|---|---|---|
| 2012/0140153 A1* | 6/2012 | Kawashima | G02F 1/133707 349/96 |
| 2012/0300148 A1* | 11/2012 | Hong | G02F 1/134336 445/24 |
| 2019/0113810 A1 | 4/2019 | Sasaki | |

FOREIGN PATENT DOCUMENTS

| | | | |
|---|---|---|---|
| CN | 101923251 A | 12/2010 | |
| CN | 102062973 A | 5/2011 | |

(Continued)

*Primary Examiner* — Paul C Lee
(74) *Attorney, Agent, or Firm* — PV IP PC; Wei Te Chung; Christopher S Ruprecht

(57) ABSTRACT

The present application discloses a liquid crystal alignment method, a liquid crystal display panel, and a mobile terminal. In a liquid crystal alignment process, a first common electrode receives an alignment voltage, and a pretilt angle of a liquid crystal molecule arranged corresponding to a slit is smaller than a pretilt angle of a liquid crystal molecule arranged corresponding to a branch electrode. In an actual driving process, because an overall pretilt angle of liquid crystal molecules is increased and pretilt angles in a same domain of a subpixel are differentiated, a response time and view angle features of medium and low grayscale of the liquid crystal display panel can be improved.

20 Claims, 6 Drawing Sheets

(56) References Cited

FOREIGN PATENT DOCUMENTS

| | | | | |
|---|---|---|---|---|
| CN | 102279486 | A | 12/2011 | |
| CN | 104246588 | A | 12/2014 | |
| CN | 104777671 | A | 7/2015 | |
| CN | 107490903 | A * | 12/2017 | |
| CN | 108957864 | A * | 12/2018 | ....... G02F 1/133753 |
| CN | 110031990 | A | 7/2019 | |
| CN | 110073282 | A | 7/2019 | |
| CN | 209215825 | U | 8/2019 | |
| CN | 110596919 | A | 12/2019 | |
| CN | 113655664 | A | 11/2021 | |
| KR | 20120113025 | A | 10/2012 | |
| KR | 20150129239 | A | 11/2015 | |
| TW | 200708812 | A | 3/2007 | |

* cited by examiner

LIQUID CRYSTAL ALIGNMENT METHOD COMPRISING APPLYING AN ALIGNMENT VOLTAGE TO A FIRST COMMON ELECTRODE, LIQUID CRYSTAL DISPLAY PANEL, AND MOBILE TERMINAL

BACKGROUND

Technical Field

The present invention relates to display technologies, and more particularly, to a liquid crystal alignment method, a liquid crystal display panel, and a mobile terminal.

Related Art

A large-size thin film transistor liquid crystal display (TFT-LCD) is currently the mainstream technologies used in TVs. With the continuous improvement of information technology and living standards, people have increasingly high requirements for display quality such as a response time and a view angle. In addition, compared to an in-plane switching liquid crystal display (IPS-LCD) and an organic light-emitting diode display (OLED), a vertical alignment liquid crystal display (VA-LCD) has a poor view angle. Therefore, the improvement of the view angle has always been the focus of VA-LCD researchers. According to a transmissive liquid crystal alignment principle and a driving scheme, if the view angle is to be improved, a pixel needs to be divided into a plurality of domains, but this may cause a transmittance loss. Under a same pixel structure condition, a liquid crystal pretilt angle is one of the important factors affecting the response time and the view angle. Therefore, a solution of differentiating liquid crystal pretilt angles needs to be developed, thereby significantly improving the display quality.

The principle of the existing HVA alignment technology and the liquid crystal penetration features are shown in FIG. 1(a) to FIG. 1(c), where FIG. 1(a) is a cross-sectional view of a liquid crystal display panel before alignment, FIG. 1(b) is a cross-sectional view of a liquid crystal display panel after alignment is completed, and FIG. 1(c) is a schematic diagram of an electric field strength between a branch electrode and a common electrode and an electric field strength between a slit and a common electrode in a pixel layer in an alignment process. FIG. 2 is a schematic structural diagram of a subpixel of a pixel layer. In an alignment process, a common electrode 140 receives an alignment voltage, and a direction of an electric field is directed from the common electrode 140 to a pixel layer 150. As can be seen in FIG. 1(c), because there is little difference between an electric field strength between a branch electrode 152 and the common electrode 140 and an electric field strength between a slit 153 and the common electrode 140 in a same domain of a subpixel 151 of the pixel layer 150, for example, when the electric field strength between the branch electrode 152 and the common electrode 140 is an electric field strength formed under a voltage of 17 V, in this case, the electric field strength between the slit 153 and the common electrode 140 may reach an electric field strength formed under a voltage of 16 V. In this way, in a liquid crystal layer 130, a pretilt angle formed by a liquid crystal molecule 131 corresponding to the branch electrode 152 and a pretilt angle formed by a liquid crystal molecule 131 corresponding to the slit 153 are basically the same. Referring to FIG. 1(b), a pretilt angle $\theta_a$ of a liquid crystal molecule 131 is about 1.4°. Consequently, in an actual driving process, because there is no difference between the pretilt angle of the liquid crystal molecule 131 corresponding to the branch electrode 152 and the pretilt angle of the liquid crystal molecule 131 corresponding to the slit 153 in a same domain region of the subpixel 151, a low grayscale view angle of the panel is relatively single.

SUMMARY

Embodiments of the present application provide a liquid crystal alignment method, a liquid crystal display panel, and a mobile terminal, so as to resolve the problem of a poor low grayscale view angle of the existing liquid crystal display panel.

An embodiment of the present application provides a liquid crystal alignment method, including:
providing a first substrate and a second substrate arranged opposite to each other;
forming an electrode layer and a pixel layer spaced on one side of the first substrate facing the second substrate, where the pixel layer is arranged between the electrode layer and the second substrate, the pixel layer includes a plurality of subpixels arranged in an array, each of the subpixels includes at least two branch electrodes arranged in parallel, and a slit is formed between two of the branch electrodes;
forming a first common electrode on one side of the second substrate facing the first substrate;
forming a liquid crystal layer between the first substrate and the second substrate, where the liquid crystal layer includes a plurality of liquid crystal molecules;
applying an alignment voltage to the first common electrode, so that a pretilt angle formed by a liquid crystal molecule arranged corresponding to the slit is smaller than a pretilt angle formed by a liquid crystal molecule arranged corresponding to the branch electrode; and
performing irradiation with ultraviolet light to fix the liquid crystal molecules at the pretilt angles.

Further, an electric field strength between the slit and the first common electrode is lower than an electric field strength between the branch electrode and the first common electrode.

Further, a voltage value of the alignment voltage is in a range of 50-100 V.

An embodiment of the present application further provides a liquid crystal display panel, including: a first substrate and a second substrate arranged opposite to each other; a liquid crystal layer, including a plurality of liquid crystal molecules, and arranged between the first substrate and the second substrate; a first common electrode, arranged on one side of the second substrate facing the first substrate; a pixel layer, arranged on one side of the first substrate facing the second substrate, where the pixel layer includes a plurality of subpixels arranged in an array, each of the subpixels includes at least two branch electrodes arranged in parallel, and a slit is formed between two of the branch electrodes; and an electrode layer, arranged between the first substrate and the pixel layer, and spaced apart from the pixel layer.

Further, the liquid crystal display panel further includes a second common electrode layer, and the second common electrode layer is arranged on the first substrate and is arranged on a same layer as the electrode layer, and the electrode layer is an ITO electrode layer Further, a spacing between the first common electrode and the pixel layer is in a range of 3.2-3.3 μm.

Further, absolute values of differences between azimuth angles of liquid crystal molecules at edge positions of opposite sides of the branch electrode and an azimuth angle of a liquid crystal molecule at a central position of the branch electrode are equal.

Further, a gate insulating layer and a protective layer are arranged between the electrode layer and the pixel layer in a stacking manner, and the pixel layer is arranged on the protective layer.

Further, the liquid crystal display panel further includes a first alignment layer arranged on one side of the pixel layer facing the liquid crystal layer and a second alignment layer arranged on one side of the first common electrode facing the liquid crystal layer.

An embodiment of the present application further provides a mobile terminal, including a terminal body and the liquid crystal display panel described above.

The beneficial effects of the present application are as follows: In a liquid crystal alignment process, an alignment voltage is applied to a first common electrode, so that in a same domain region of a subpixel, there is a difference between a pretilt angle of a liquid crystal molecule in a liquid crystal layer corresponding to a branch electrode and a pretilt angle of a liquid crystal molecule in a liquid crystal layer corresponding to a slit, and a difference is obvious. Therefore, in an actual driving process of the liquid crystal display panel, because an overall pretilt angle of liquid crystal molecules is increased and pretilt angles in a same domain are differentiated, a response time and view angle features of medium and low grayscale of the liquid crystal display panel can be improved.

BRIEF DESCRIPTION OF THE DRAWINGS

The following describes specific implementations of this application in detail with reference to the accompanying drawings, to make the technical solutions and other beneficial effects of this application obvious.

The component numbers in the figures are as follows.

100. liquid crystal display panel, 110. first substrate, 120. second substrate, 130. liquid crystal layer, 131. liquid crystal molecule, 131a. liquid crystal molecule region arranged corresponding to a branch electrode, 131b. liquid crystal molecule region arranged corresponding to a slit, 140. first common electrode, 150. pixel layer, 151. subpixel, 151a. main region, 151b. secondary region, 152. branch electrode, 153. slit, 160. electrode layer, 170. gate insulating layer, 180. protective layer, 191. second common electrode, 192. third common electrode;

200. scan line;

300. data line.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of this invention without creative efforts shall fall within the protection scope of this invention.

In a liquid crystal display panel, an electrode layer (ITO electrode layer) is added on a first substrate, and an alignment voltage is applied to a first common electrode in a liquid crystal alignment process, so that in a same domain region of a subpixel, there is a difference between a pretilt angle of a liquid crystal molecule in a liquid crystal layer corresponding to a branch electrode and a pretilt angle of a liquid crystal molecule in a liquid crystal layer corresponding to a slit. Therefore, a response time and view angle features of medium and low grayscale of the liquid crystal display panel can be improved. As a typical application, the liquid crystal display panel may be applied to a mobile terminal, such as a TFT-LCD mobile terminal with a VA-LCD panel, that is, the liquid crystal display panel is a VA-LCD panel, and the mobile terminal is a TFT-LCD display.

Figure 1A:
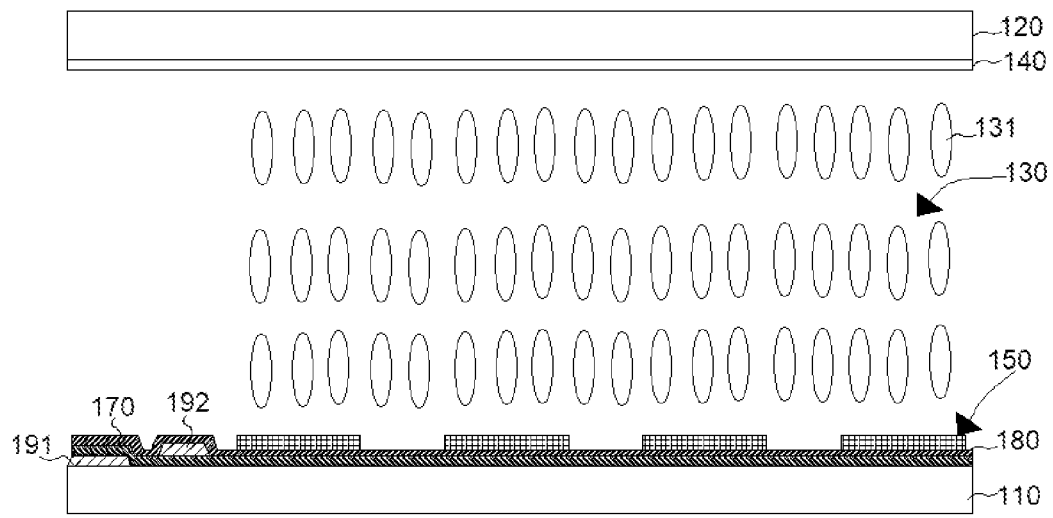
FIG. 1(a) is a cross-sectional view of a liquid crystal display panel before liquid crystal alignment.
Figure 1B:
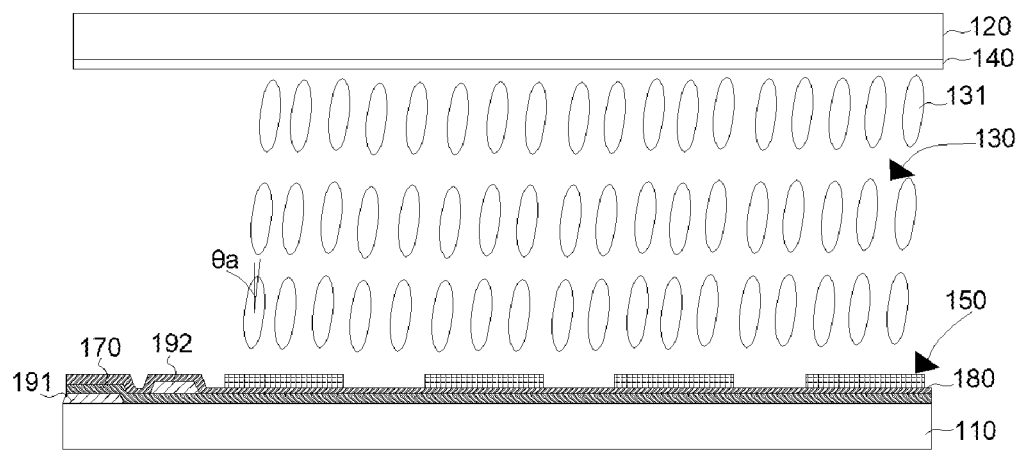
FIG. 1(b) is a cross-sectional view of a liquid crystal display panel after liquid crystal alignment is completed.
Figure 1C:
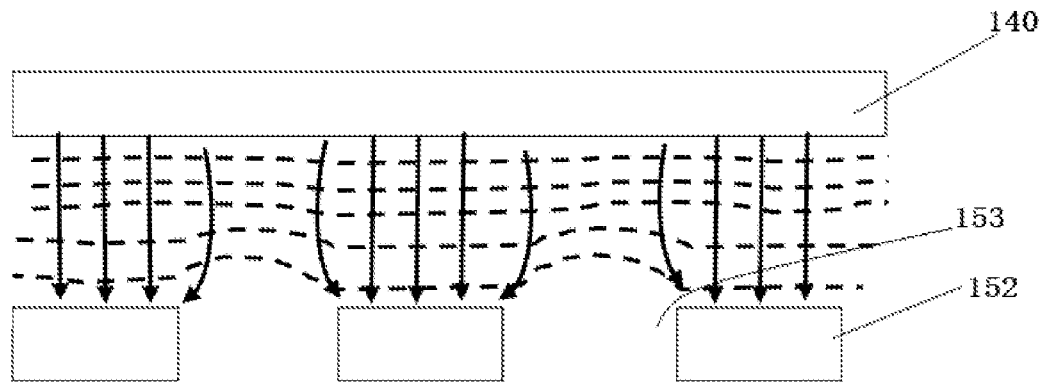
FIG. 1(c) is a schematic diagram of an electric field strength between a branch electrode and a first common electrode and an electric field strength between a slit and the first common electrode in a same domain region of a subpixel of a pixel layer in a liquid crystal alignment process of the existing liquid crystal display panel.
Figure 2:
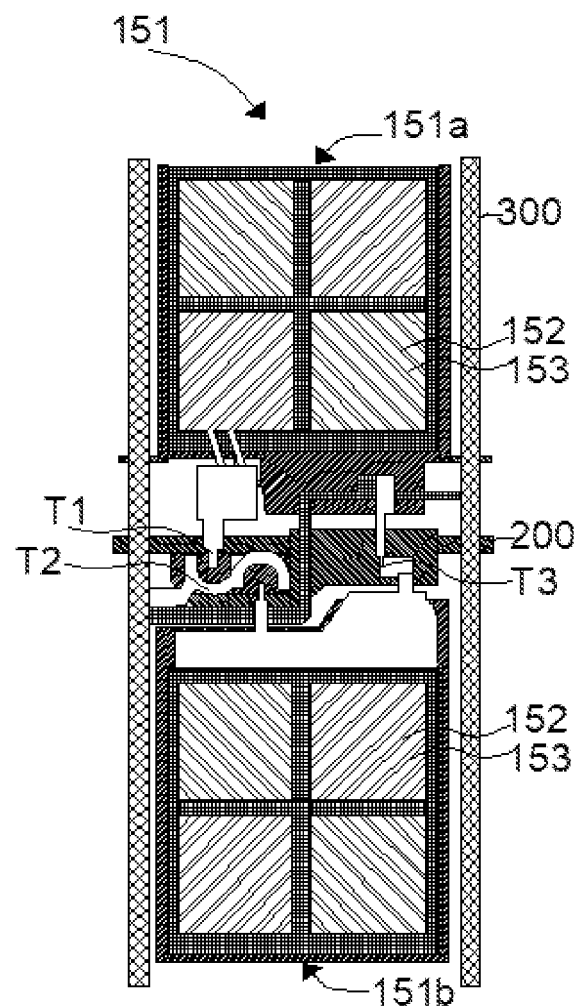
FIG. 2 is a schematic structural diagram of a subpixel of a pixel layer.
Figure 3:
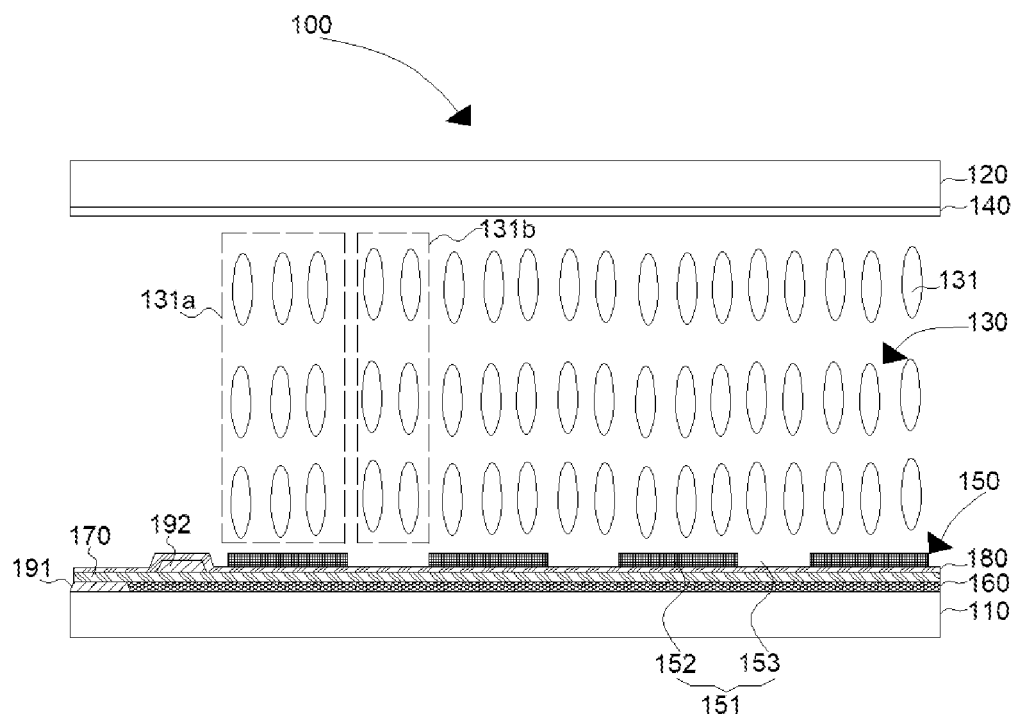
FIG. 3 is a cross-sectional view of a liquid crystal display panel before liquid crystal alignment according to an exemplary embodiment of the present invention.
Figure 4:
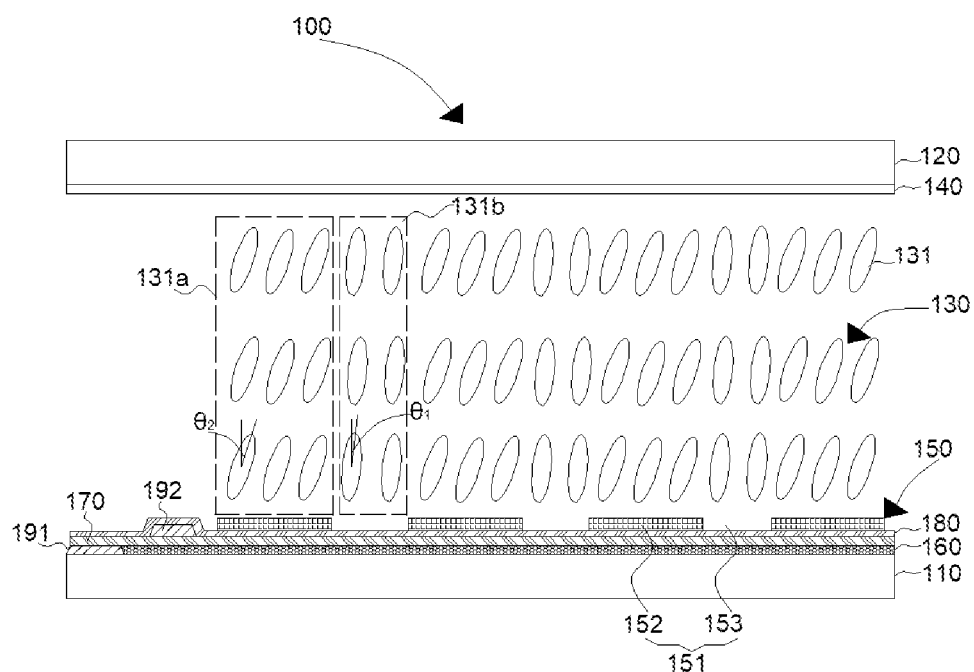
FIG. 4 is a cross-sectional view of a liquid crystal display panel after liquid crystal alignment is completed according to an exemplary embodiment of the present invention.

Referring to FIG. 3 and FIG. 4, in an embodiment of the present invention, a liquid crystal display panel 100 includes a first substrate 110, a second substrate 120, a liquid crystal layer 130, a first common electrode 140, a pixel layer 150, and an electrode layer 160. The first substrate 110 and the second substrate 120 are arranged opposite to each other, the electrode layer 160 is arranged on one side of the first substrate 110 facing the second substrate 120, and the liquid crystal layer 130 includes a plurality of liquid crystal molecules 131. A gate insulating layer 170 (GI layer) and a protective layer 180 (PV layer) are arranged between the electrode layer 160 and the pixel layer 150 in a stacking manner. The pixel layer 150 is arranged on one side of the protective layer 180 away from the gate insulating layer 170, a third common electrode 192 (M2) is arranged between the protective layer 180 and the gate insulating layer 170, and a second common electrode 191 (M1) is arranged at one end of the electrode layer 160. The second common electrode 191 is arranged on the first substrate 110, and the electrode layer 160 and the second common electrode 191 are arranged on a same layer. The pixel layer 150 includes a plurality of subpixels 151 arranged in an array. For a structure of the subpixels 151, refer to FIG. 2. The structure of the subpixels 151 in this embodiment takes a 3T_8 domain structure as an example, but is not limited to the 3T_8 domain structure. A 4-domain structure may also be used, and quantities of thin film transistors and capacitors in a pixel structure are not limited. For example, for 2T1C or 3T1C, each subpixel 151 includes a main region 151a and a secondary region 151b. In a pixel array, a scan line 200 is arranged between two adjacent rows of subpixels, and a data line 300 is arranged between two adjacent rows of subpixels. Each of the subpixels 151 further includes: a main region thin film transistor T1, a secondary region thin film transistor T2, and a shared thin film transistor T3. A gate of the main region thin film transistor T1 is connected to the scan line 200, a source of the main region thin film transistor T1 is connected to the data line 300, and a drain of the main region thin film transistor T1 is connected to a main region pixel electrode (not shown in the figure) in the main region 151a. A gate of the secondary region thin film transistor T2 is connected to the scan line 200, a source of the secondary region thin film transistor T2 is connected to the data line 300, and a drain of the secondary region thin film transistor T2 is connected to a secondary region pixel electrode (not shown in the figure) in the secondary region 151b. A gate of the shared thin film transistor T3 is connected to the scan line 200, a source of the shared thin film transistor T3 is connected to the main region pixel electrode, and a drain of the shared thin film transistor T3 is connected to the secondary region pixel electrode. The main region pixel electrode and the secondary region pixel electrode form a pixel electrode of the subpixels 151. The second common electrode 191 and the third common electrode 192 are configured to transmit a voltage signal and a control signal.

In this embodiment, the slit 153 includes a region between two adjacent branch electrodes 152 in one subpixel 151. As an improvement, the slit 153 may further include a region between two adjacent subpixels 151, specifically, a region between adjacent pixel electrodes of two adjacent subpixels 151.

The main region pixel electrode is divided into 4 domains, each domain includes a plurality of branch electrodes 152 arranged in parallel and spaced apart, and a slit 153 is formed between two adjacent branch electrodes 152. A secondary region storage electrode is divided into 4 domains, each domain includes a plurality of branch electrodes 152 arranged in parallel and spaced apart, and a slit 153 is formed between two adjacent branch electrodes 152. A region at which the branch electrode 152 is located is a line region, and a region at which the slit 153 is located is a space region. In this embodiment, one electrode layer 160 corresponds to an entire pixel array in the pixel layer 150. As a preferred manner of the present invention, the electrode layer 160 includes a plurality of electrode sublayers (not shown in the figure) arranged in sequence, and one electrode sublayer corresponds to some of the subpixels 151 in the pixel array.

Figure 5:
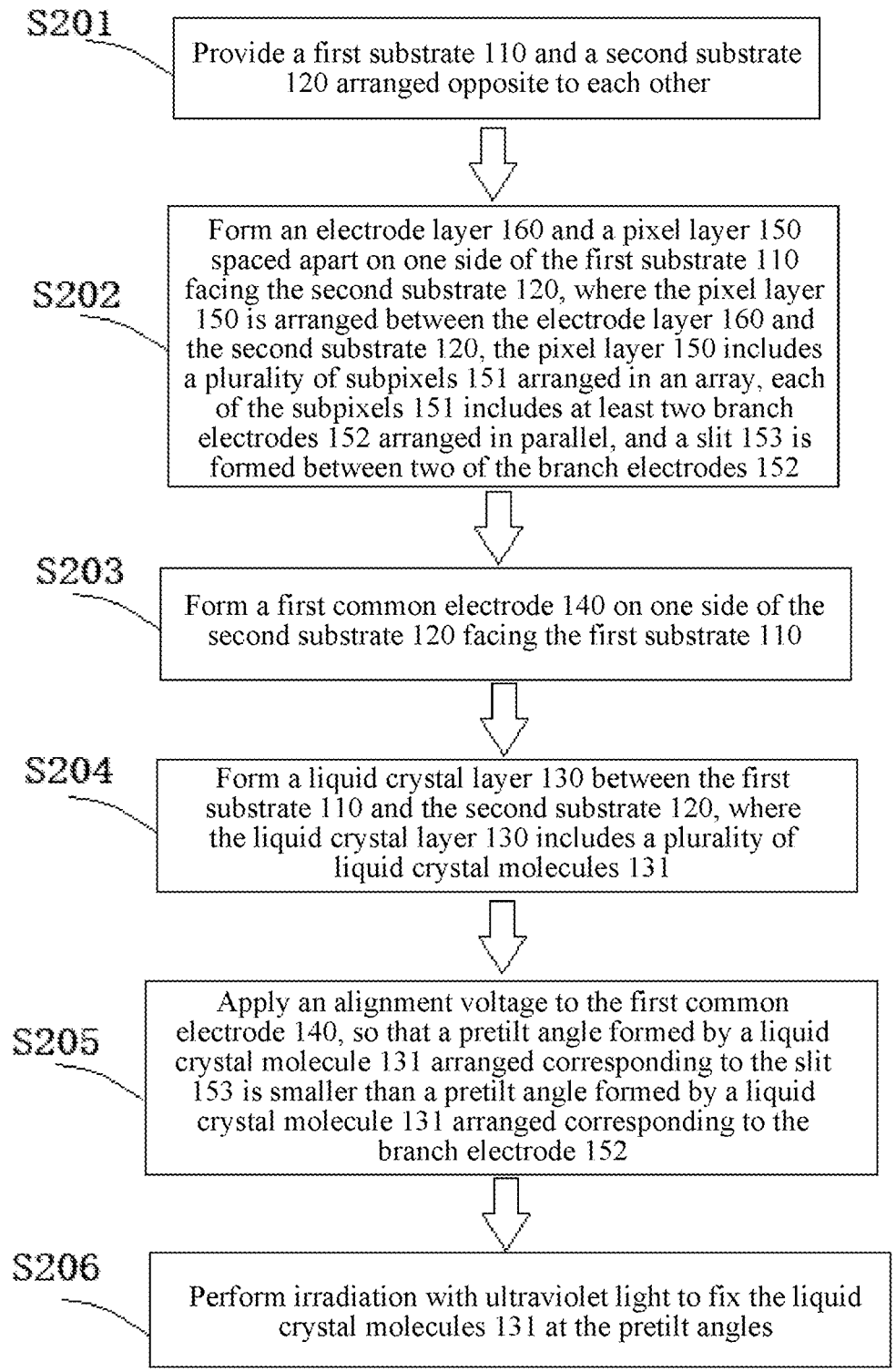
FIG. 5 is a schematic flowchart of a liquid crystal alignment method according to an exemplary embodiment of the present invention.

In this embodiment, referring to FIG. 5, a liquid crystal alignment method Includes:

S201. Provide a first substrate 110 and a second substrate 120 arranged opposite to each other.

S202. Form an electrode layer 160 and a pixel layer 150 spaced apart on one side of the first substrate 110 facing the second substrate 120, where the pixel layer 150 is arranged between the electrode layer 160 and the second substrate 120, the pixel layer 150 includes a plurality of subpixels 151 arranged in an array, each of the subpixels 151 includes at least two branch electrodes 152 arranged in parallel, and a slit 153 is formed between two of the branch electrodes 152.

S203. Form a first common electrode 140 on one side of the second substrate 120 facing the first substrate 110.

S204. Form a liquid crystal layer 130 between the first substrate 110 and the second substrate 120, where the liquid crystal layer 130 includes a plurality of liquid crystal molecules 131.

S205. Apply an alignment voltage to the first common electrode 140, so that a pretilt angle formed by a liquid crystal molecule 131 arranged corresponding to the slit 153 is smaller than a pretilt angle formed by a liquid crystal molecule 131 arranged corresponding to the branch electrode 152.

S206. Perform irradiation with ultraviolet light to fix the liquid crystal molecules 131 at the pretilt angles.

Specifically, a first alignment layer (not shown in the figure) may be arranged on one side of the pixel layer 150 facing the second substrate 120, and a second alignment layer (not shown in the figure) may be arranged on one side of the first common electrode 140 facing the first substrate 110.

In fact, electric fields are formed between the first common electrode 140 and a pixel electrode (the pixel electrode includes a plurality of the branch electrodes 152) in the subpixels 151 and between the first common electrode 140 and the electrode layer 160. Because a distance between the first common electrode 140 and the pixel electrode is less than a distance between the common electrode 140 and the electrode layer 160, an electric field between the first common electrode 140 and the branch electrode 152 of the pixel electrode is greater than the electric field between the first common electrode 140 and the electrode layer 160. Therefore, a pretilt angle of a liquid crystal molecule 131 at a position corresponding to the branch electrode 152 is greater than a pretilt angle of a liquid crystal molecule at a position corresponding to the slit 153.

The ultraviolet light is irradiated by means of an ultraviolet main curing (UVM) machine. In step S206, the liquid crystal display panel 100 is transported to the UVM machine, and the UVM machine exposes the liquid crystal display panel 100 to ultraviolet rays. The first alignment layer and the second alignment layer interact with the liquid crystal molecule under the irradiation of the ultraviolet rays, thereby maintaining fixed pretilt angles of the liquid crystal molecules, and completing a liquid crystal alignment process of the liquid crystal display panel 100.

An alignment voltage is applied to the first electrode layer 140, and the alignment voltage is a high voltage. In this embodiment, the alignment voltage is set to 50 V, no voltage is applied to the pixel layer 150 and the electrode layer 160 (that is, the voltages on the pixel layer 150 and the electrode layer 160 are 0 V), and the first common electrode 140 receives the alignment voltage. Due to a voltage difference, a first electric field is formed between the electrode layer 160 and the first common electrode 140, and a direction of the first electric field is directed from the first common electrode 140 (Cf first common electrode) to the electrode layer 160; and a second electric field is formed between the electrode layer 160 and the pixel layer 150, and a direction of the second electric field is directed from the first common electrode 140 (Cf first common electrode) to the pixel layer 150. Because a distance between the first common electrode 140 and the electrode layer 160 is greater than a distance between the first common electrode 140 and the pixel layer 150, a strength of the first electric field is lower than a strength of the second electric field.

Specifically, in an embodiment, when an alignment voltage of 50 V is applied to the first common electrode 140, an electric field strength generated by a voltage difference of about 17 V is formed between the branch electrode 152 and the first common electrode 140, and an electric field strength generated by a voltage difference of about 10 V is formed between the slit 153 and the first common electrode 140. A difference between a voltage value between the branch electrode 152 and the first common electrode 140 and a voltage value between the slit 153 and the first common electrode 140 is 7 V (The voltage difference of 7 V herein is only an example in this embodiment, a voltage difference is not fixed, and an actual voltage difference may be adjusted as required). Therefore, when the first common electrode 140 receives a high voltage (the high voltage in this embodiment is 50 V), a pretilt angle $\theta_2$ formed by a liquid crystal molecule 131 in a liquid crystal molecule region 131*a* arranged corresponding to the branch electrode is significantly higher than a pretilt angle $\theta_1$ formed by a liquid crystal molecule 131 in a liquid crystal molecule region 131*b* arranged corresponding to the slit. That is, a pretilt angle of a liquid crystal molecule corresponding to the line region and a pretilt angle of a liquid crystal molecule corresponding to the space region are differentiated. In this embodiment, the pretilt angle $\theta_2$ formed by the liquid crystal molecule 131 in the liquid crystal molecule region 131*a* arranged corresponding to the branch electrode is 2.4°, the pretilt angle $\theta_1$ formed by the liquid crystal molecule 131 in the liquid crystal molecule region 131*b* arranged corresponding to the slit is 0.4°, and a difference between $\theta_2$ and $\theta_1$ is 2.0°. Compared to that all pretilt angles $\theta_a$ of the liquid crystal molecules in the existing liquid crystal display panel are 1.4°, in this embodiment, an overall pretilt angle is increased and pretilt angles are differentiated. Further, in an actual driving process of the liquid crystal display panel 100, due to the overall increase and diversification of the pretilt angle, a response time and view angle features of medium and low grayscale of the liquid crystal display panel 100 can be improved.

Degrees such as 0.4°, 2.0°, and 1.4° of the pretilt angle are all exemplary degrees in this embodiment and are not fixed values. A specific degree of the pretilt angle may be determined according to actual needs.

The electric field strength may vary with a magnitude of the alignment voltage applied to the first common electrode 140, to adjust magnitudes of $\theta_1$ and $\theta_2$, and adjust the difference between $\theta_1$ and $\theta_2$. That is, a differentiation range of the pretilt angles of the liquid crystal molecules 131 between the line region and the space region can be adjusted according to actual user requirements. A spacing between the first common electrode 140 and the pixel layer 150 is set to a range of 3.2-3.3 µm, which can ensure the electric field strength.

In this embodiment, applying a high voltage of 45 V to the first common electrode 140 in the liquid crystal alignment process can increase a pretilt angle formed by the liquid crystal molecule 131 arranged corresponding to the branch electrode 152, and correspondingly reduce a pretilt angle formed by the liquid crystal molecule 131 arranged corresponding to the slit 153. After post-processing steps such as retreat and UV light irradiation, the pretilt angle formed by the liquid crystal molecule 131 in the liquid crystal molecule region 131*a* arranged corresponding to the branch electrode is fixed at $\theta_2$ (2.4° in this embodiment), and the pretilt angle formed by the liquid crystal molecule 131 in the liquid crystal molecule region 131*b* arranged corresponding to the slit is fixed at $\theta_1$ (0.4° in this embodiment).

In the actual driving process of the liquid crystal display panel 100, a voltage is applied to the first common electrode 140, and the first common electrode 140 receives a driving voltage (the same as an actual driving manner of the existing liquid crystal display panel). The electrode layer 160 does not receive a voltage (that is, the voltage on the electrode layer 160 is 0 V), and a voltage on the pixel layer 150 is about 8 V.

In addition, a relationship of a transmittance with an azimuth angle φ and a tilt angle θ is shown in the following equation:

$$T = \tfrac{1}{2} \ast \sin^2(2\varphi) \ast \sin^2(f(\theta))$$

Figure 6:
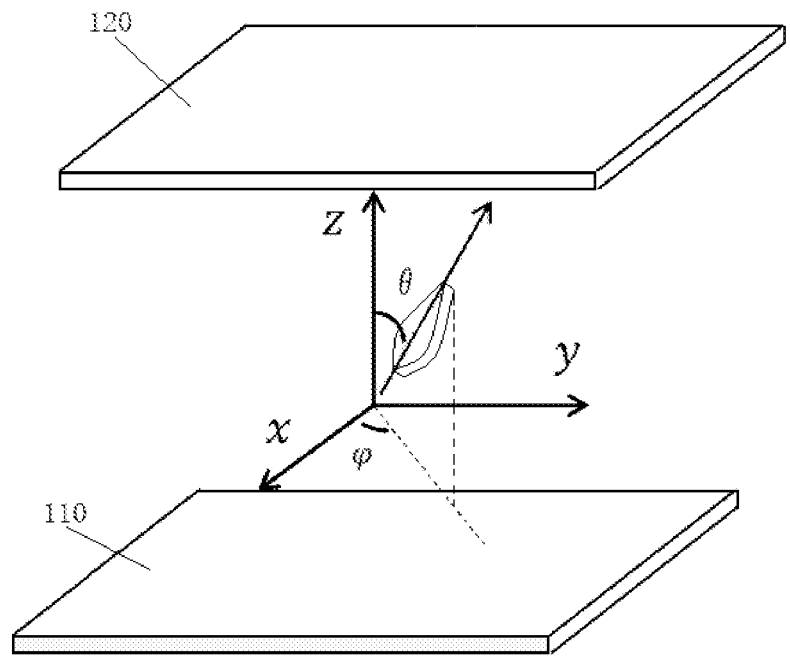
FIG. 6 is a schematic diagram of a first substrate, a second substrate, a pretilt angle of a liquid crystal molecule, and an azimuth angle of a liquid crystal molecule.
Figure 7:
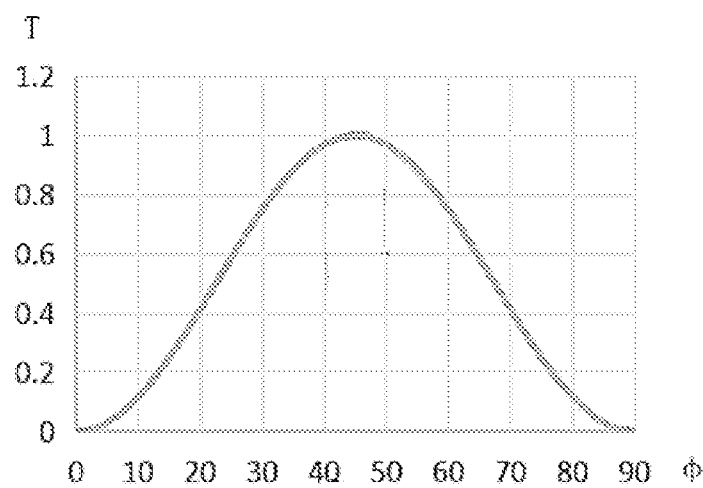
FIG. 7 is a schematic diagram of a relational curve between an azimuth angle and a transmittance.

With reference to the relational expression and referring to FIG. 6 and FIG. 7, when the pretilt angle θ is fixed, the transmittance T is the largest when the azimuth angle φ is 45° (in this case, a major axis of the liquid crystal molecule 131 is parallel to a lengthwise direction of the branch electrode 152), and a brightness of the liquid crystal display panel 100 is the highest; and when φ is 35° or 55°, T is reduced, and the brightness of the liquid crystal display panel 100 is relatively reduced. Referring to FIG. 6, the azimuth angle φ is an angle between an x-axis and an orthographic projection line of the major axis of the liquid crystal molecule 131 on one side of the first substrate 110 facing the second substrate 120, and the pretilt angle θ is an angle between the major axis of the liquid crystal molecule 131 and a z-axis (that is, a vertical direction).

In this embodiment of the present invention, in the liquid crystal alignment process, the electrode layer 160 receives an alignment voltage, and a direction of an electric field (that is, an alignment electric field) is directed from the electrode layer 160 to the first common electrode 140. After the liquid crystal alignment is completed, the pretilt angle θ is fixed (for example, in this embodiment, $\theta_1$ is 0.4° and $\theta_2$ is 2.4°). In this case, due to the effect of the alignment electric field formed by the alignment voltage, electric field strengths of edge regions (that is, regions near two sides of the first substrate 110 in FIG. 3) are lower than an electric field strength of a central region of the electric field. Therefore, the azimuth angle φ of the liquid crystal molecule corresponding to the edge region of the electric field is not 45°, but may be 35° or 55°, being smaller than an azimuth angle of a liquid crystal molecule 131 corresponding to the central region.

Figure 8:
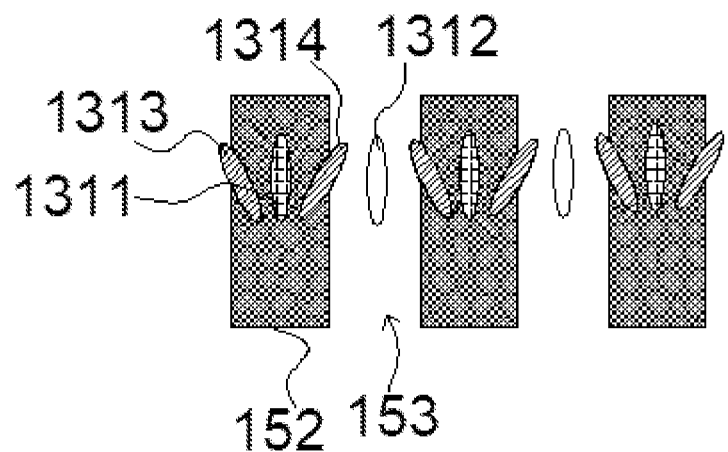
FIG. 8 is a schematic diagram of azimuth angles of liquid crystal molecules on a liquid crystal display panel after liquid crystal alignment is completed according to an exemplary embodiment of the present invention.

Referring to FIG. 8, in this embodiment, the liquid crystal molecules 131 at edge positions on opposite sides of the branch electrode 152 are a liquid crystal molecule 1313 (an azimuth angle is 55°) and a liquid crystal molecule 1314 (an azimuth angle is 35°), the liquid crystal molecule 131 at a central position of the branch electrode 152 is a liquid crystal molecule 1311 (an azimuth angle is 45°), and the liquid crystal molecule 131 corresponding to the slit 153 is a liquid crystal molecule 1312. A difference between the azimuth angle of the liquid crystal molecule 1313 and the azimuth angle of the liquid crystal molecule 1311 is 55°−45°=10°, and a difference between the azimuth angle of the liquid crystal molecule 1314 and the azimuth angle of the liquid crystal molecule 1311 is 35°−45°=−10°. Absolute values of 10° and −10° are both 10°, that is, the absolute values are equal.

In an actual driving process of the liquid crystal display panel 100, when a driving voltage is applied to the pixel electrode of the subpixels 151 in the pixel layer 150, a direction of an electric field (a driving electric field) is directed from the pixel layer 150 to the common electrode 140, and is opposite to a direction of an alignment electric field. Due to the effect of a driving electric field, a force opposite to that in a previous liquid crystal alignment process is applied to liquid crystal molecules at edge regions of the driving electric field. An electric field strength between the branch electrode 152 and the first common electrode 140 is slightly greater than an electric field strength between the slit 153 and the first common electrode 140. Therefore, a rotation direction of the liquid crystal molecule 131 driven by an edge electric field is complementary to a direction of a formed azimuth angle, so that liquid crystal azimuth angles of the liquid crystal display panel are all basically close to 45 degrees, causing a small difference of liquid crystal penetration contributions of the slit region and the space region. Therefore, this design can further increase the transmittance.

Figure 9:
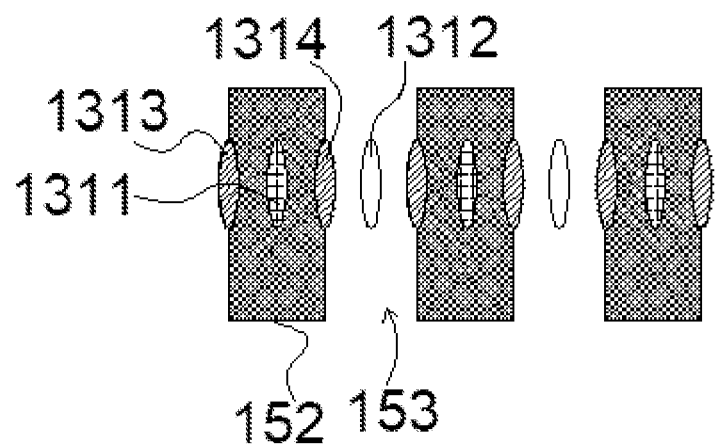
FIG. 9 is a schematic diagram of azimuth angles of liquid crystal molecules during actual driving of a liquid crystal display panel according to an exemplary embodiment of the present invention.

In this embodiment, referring to FIG. 9, in an actual driving process, the azimuth angles φ of the liquid crystal molecule 1313 and the liquid crystal molecule 1314 are both that is, a difference between the azimuth angle φ of the liquid crystal molecule 1313 and the azimuth angle φ of the liquid crystal molecule 1311 is 0, and a difference between the azimuth angle φ of the liquid crystal molecule 1314 and the azimuth angle φ of the liquid crystal molecule 1311 is 0; or an absolute value of a difference between the azimuth angle φ of the liquid crystal molecule 1313 and the azimuth angle φ of the liquid crystal molecule 1311 is less than or equal to 1, and an absolute value of a difference between the azimuth angle φ of the liquid crystal molecule 1314 and the azimuth angle φ of the liquid crystal molecule 1311 is less than or equal to 1. For example, the azimuth angle of the liquid crystal molecule 1313 is 46°, and the azimuth angle of the liquid crystal molecule 1314 is 44°, both being close to 45°. In this way, a difference between a liquid crystal penetration contribution of a slit region and the space region is small, so that the transmittance T of the liquid crystal display panel 100 is at or close to the maximum. Compared to the existing liquid crystal display panel, the overall transmittance T can be improved, so that the brightness of the liquid crystal display panel 100 is higher and more uniform.

In conclusion, the present disclosure has been disclosed above through preferred embodiments. However, the preferred embodiments are not intended to limit the present disclosure, and a person of ordinary skill in the art can make various modifications and improvements without departing from the spirit and scope of the present disclosure. Therefore, the protection scope of the present disclosure should be subject to the scope defined by the claims.

What is claimed is:

1. A liquid crystal alignment method, comprising:
   providing a first substrate and a second substrate arranged opposite to each other;
   forming an electrode layer and a pixel layer spaced on one side of the first substrate facing the second substrate, wherein the pixel layer is arranged between the electrode layer and the second substrate, the pixel layer comprises a plurality of subpixels arranged in an array, each of the subpixels comprises at least two branch electrodes arranged in parallel, and a slit is formed between two of the branch electrodes;
   forming a first common electrode on one side of the second substrate facing the first substrate;
   forming a liquid crystal layer between the first substrate and the second substrate, wherein the liquid crystal layer comprises a plurality of liquid crystal molecules;
   applying an alignment voltage to the first common electrode, a first voltage to the electrode layer, and a second voltage to the pixel layer, wherein the alignment voltage is greater than the first voltage and the second voltage, and the first voltage is equal to the second voltage, so that a pretilt angle formed by a liquid crystal molecule arranged corresponding to the slit is smaller than a pretilt angle formed by a liquid crystal molecule arranged corresponding to the branch electrode; and
   performing irradiation with ultraviolet light to fix the liquid crystal molecules at the pretilt angles.

2. The liquid crystal alignment method according to claim 1, wherein an electric field strength between the slit and the first common electrode is lower than an electric field strength between the branch electrode and the first common electrode.

3. The liquid crystal alignment method according to claim 1, wherein a voltage value of the alignment voltage is in a range of 50-100 V.

4. The liquid crystal alignment method according to claim 1, wherein during actual driving after alignment is completed, a driving voltage is applied to a pixel electrode of the subpixels in the pixel layer, and azimuth angles of liquid crystal molecule at edge positions of opposite sides of the branch electrode are the same as an azimuth angle of a liquid crystal molecule at a central position of the branch electrode, or absolute values of differences between azimuth angles of liquid crystal molecules at edge positions of opposite sides of the branch electrode and an azimuth angle of a liquid crystal molecule at a central position of the branch electrode are less than or equal to 1.

5. A liquid crystal display panel, comprising:
   a first substrate and a second substrate arranged opposite to each other;
   a liquid crystal layer, comprising a plurality of liquid crystal molecules, and arranged between the first substrate and the second substrate;
   a first common electrode, arranged on one side of the second substrate facing the first substrate;
   a pixel layer, arranged on one side of the first substrate facing the second substrate, wherein the pixel layer comprises a plurality of subpixels arranged in an array, each of the subpixels comprises at least two branch electrodes arranged in parallel, and a slit is formed between two of the branch electrodes; and
   an electrode layer, arranged between the first substrate and the pixel layer, and spaced apart from the pixel layer,
   wherein when an alignment voltage is applied to the first common electrode, a first voltage is applied to the electrode layer, and a second voltage is applied to the pixel layer, the alignment voltage is greater than the first voltage and the second voltage, the first voltage is equal to the second voltage, so that a pretilt angle formed by a liquid crystal molecule arranged corresponding to the slit is smaller than a pretilt angle formed by a liquid crystal molecule arranged corresponding to the branch electrode.

6. The liquid crystal display panel according to claim 5, wherein the liquid crystal display panel further comprises a second common electrode layer, and the second common electrode layer is arranged on the first substrate and is arranged on a same layer as the electrode layer.

7. The liquid crystal display panel according to claim 5, wherein the electrode layer is an ITO electrode layer.

8. The liquid crystal display panel according to claim 5, wherein a spacing between the first common electrode and the pixel layer is in a range of 3.2-3.3 μm.

9. The liquid crystal display panel according to claim 5, wherein absolute values of differences between azimuth angles of liquid crystal molecules at edge positions of opposite sides of the branch electrode and an azimuth angle of a liquid crystal molecule at a central position of the branch electrode are equal.

10. The liquid crystal display panel according to claim 5, wherein a gate insulating layer and a protective layer are arranged between the electrode layer and the pixel layer in a stacking manner, and the pixel layer is arranged on the protective layer.

11. The liquid crystal display panel according to claim 10, wherein a third array common electrode is arranged between the protective layer and the gate insulating layer.

12. The liquid crystal display panel according to claim 5, wherein a first alignment layer is arranged on one side of the pixel layer facing the second substrate, and a second alignment layer is arranged on one side of the first common electrode facing the first substrate.

13. A mobile terminal, wherein the mobile terminal comprises a terminal body and a liquid crystal display panel, wherein
the liquid crystal display panel comprises:
a first substrate and a second substrate arranged opposite to each other;
a liquid crystal layer, comprising a plurality of liquid crystal molecules, and arranged between the first substrate and the second substrate;
a first common electrode, arranged on one side of the second substrate facing the first substrate;
a pixel layer, arranged on one side of the first substrate facing the second substrate, wherein the pixel layer comprises a plurality of subpixels arranged in an array, each of the subpixels comprises at least two branch electrodes arranged in parallel, and a slit is formed between two of the branch electrodes; and
an electrode layer, arranged between the first substrate and the pixel layer, and spaced apart from the pixel layer,
wherein when an alignment voltage is applied to the first common electrode, a first voltage is applied to the electrode layer, and a second voltage is applied to the pixel layer, the alignment voltage is greater than the first voltage and the second voltage, the first voltage is equal to the second voltage, so that a pretilt angle formed by a liquid crystal molecule arranged corresponding to the slit is smaller than a pretilt angle formed by a liquid crystal molecule arranged corresponding to the branch electrode.

14. The mobile terminal according to claim 13, wherein the liquid crystal display panel further comprises a second common electrode layer, and the second common electrode layer is arranged on the first substrate and is arranged on a same layer as the electrode layer.

15. The mobile terminal according to claim 13, wherein the electrode layer is an ITO electrode layer.

16. The mobile terminal according to claim 13, wherein a spacing between the first common electrode and the pixel layer is in a range of 3.2-3.3 μm.

17. The mobile terminal according to claim 13, wherein absolute values of differences between azimuth angles of liquid crystal molecules at edge positions of the opposite sides of the branch electrode and an azimuth angle of a liquid crystal molecule at a central position of the branch electrode are equal.

18. The mobile terminal according to claim 13, wherein a gate insulating layer and a protective layer are arranged between the electrode layer and the pixel layer in a stacking manner, and the pixel layer is arranged on the protective layer.

19. The mobile terminal according to claim 18, wherein a third common electrode is arranged between the protective layer and the gate insulating layer.

20. The mobile terminal according to claim 13, wherein a first alignment layer is arranged on one side of the pixel layer facing the second substrate, and a second alignment layer is arranged on one side of the first common electrode facing the first substrate.

* * * * *